US008281897B1

(12) United States Patent
Lugo et al.

(10) Patent No.: US 8,281,897 B1
(45) Date of Patent: Oct. 9, 2012

(54) AUTOMATIC ACCUMULATOR SWITCHING APPARATUS AND SYSTEM

(75) Inventors: Mario R. Lugo, Spring, TX (US); Randolph G. Smith, Spring, TX (US); Noel F. Mascarenhas, Spring, TX (US)

(73) Assignee: Trendsetter Engineering, Inc., Houston, TX (US)

( * ) Notice: Subject to any disclaimer, the term of this patent is extended or adjusted under 35 U.S.C. 154(b) by 347 days.

(21) Appl. No.: 12/698,710

(22) Filed: Feb. 2, 2010

(51) Int. Cl.
*F16D 31/02* (2006.01)

(52) U.S. Cl. .......................................... 184/6.4

(58) Field of Classification Search .............. 184/6.4
See application file for complete search history.

(56) References Cited

U.S. PATENT DOCUMENTS

| | | | | |
|---|---|---|---|---|
| 2,747,370 A * | 5/1956 | Traut | .............................. | 138/31 |
| 3,049,149 A * | 8/1962 | Brueder | .................. | 137/625.17 |
| 3,051,191 A * | 8/1962 | Schollhammer et al. | ..... | 137/332 |
| 3,145,803 A * | 8/1964 | Cobert | ........................... | 184/7.4 |
| 3,174,505 A * | 3/1965 | Bauer | ..................... | 137/505.18 |
| 3,561,489 A * | 2/1971 | Furrer | ..................... | 137/625.63 |
| 3,640,299 A * | 2/1972 | Nelson | ............................... | 137/1 |
| 3,669,151 A * | 6/1972 | Fleming | .......................... | 138/31 |
| 3,677,001 A * | 7/1972 | Childers et al. | ................. | 60/398 |
| 4,036,247 A * | 7/1977 | Baugh | ........................ | 137/236.1 |
| 4,167,201 A * | 9/1979 | Zahid | ............................... | 138/30 |
| 4,185,652 A * | 1/1980 | Zintz et al. | .................... | 137/78.2 |
| 4,187,682 A * | 2/1980 | Shen | ............................... | 60/413 |
| 4,207,563 A * | 6/1980 | Soupal | ......................... | 340/626 |
| 4,649,704 A * | 3/1987 | Marsh | ............................ | 60/415 |
| 4,777,800 A * | 10/1988 | Hay, II | ........................... | 60/593 |
| 4,821,799 A * | 4/1989 | Wong | ........................... | 166/84.2 |
| 5,024,250 A * | 6/1991 | Nakamura | ....................... | 138/31 |
| 5,209,261 A * | 5/1993 | Cakmaz et al. | ........... | 137/596.17 |
| 6,202,753 B1* | 3/2001 | Baugh | ........................... | 166/364 |
| 7,234,490 B2* | 6/2007 | Dorr | ............................... | 138/31 |
| 7,520,129 B2* | 4/2009 | Springett | ........................ | 60/398 |
| 7,984,764 B2* | 7/2011 | Leonardi et al. | .............. | 166/338 |
| 2007/0240882 A1* | 10/2007 | Leonardi et al. | .............. | 166/364 |
| 2008/0104951 A1* | 5/2008 | Springett | ........................ | 60/413 |

* cited by examiner

*Primary Examiner* — William E Dondero
*Assistant Examiner* — Michael Riegelman
(74) *Attorney, Agent, or Firm* — Egbert Law Offices PLLC

(57) ABSTRACT

A grease accumulator apparatus for use in subsea applications has a bottle with an internal chamber, a plunger positioned within the internal chamber and slidable therealong, and an end cap assembly affixed to one end of the bottle. The end cap assembly has an indicator member slidably connected thereto. The indicator member is cooperative with the plunger such that an end of the indicator member moves outwardly of the end cap assembly as the plunger moves in the bottle toward the end cap assembly. The end cap assembly has a body with a housing affixed to one end thereof. The housing has a hydraulic fluid inlet and a hydraulic fluid outlet. The indicator member is movable between a position in which the inlet and outlet are fluidically connected in a second position in which fluid flow is blocked between the inlet and the outlet.

14 Claims, 5 Drawing Sheets

AUTOMATIC ACCUMULATOR SWITCHING APPARATUS AND SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to subsea system in which grease is delivered to various subsea components of offshore oil and gas production and drilling systems. More particularly, the present invention the relates to grease accumulators having an indicator showing when the accumulator bottle is near empty. Additionally, the present invention relates to automatic accumulator switching systems in which a bottle of grease is automatically actuated when another bottle becomes empty or near-empty.

2. Description of Related Art Including Information Disclosed Under 37 CFR 1.97 and 37 CFR 1.98

As well drilling operations progress into deeper waters in the search for new oil and gas reserves, new subsea equipment must be developed. Valves are the main flow control devices for this equipment. Since handwheel-operated valves cannot easily be used below the surface of bodies of water, hydraulically-actuated valves (and other pressure and flow control devices) are typically used to control the flow of oil and gas from underground reserves.

It is important to be able to provide grease into wireline tooling. The grease provide a seal for such wireline tooling. Ultimately, the subsea tree requires a substantial amount of grease so as to effectively operate.

In the past, it has been necessary to supply grease to such subsea operations by pumping grease through an extremely long umbilical. Typically, the grease will be pumped from the rig to its desired location in the subsea equipment. Unfortunately, it is often difficult to pump the grease through such long umbilicals since the pressure and temperature in deep subsea operations will cause the grease to become too viscous to be effectively pumped. To avoid this problem, it is desirable to pump grease to the equipment from a location as close as possible to the equipment.

In the past, "accumulators" have been used so as to supply fluids to subsea equipment. Pressurized hydraulic fluid is typically generated by high-pressure, low volume, positive displacement pumps. Since a large volume of hydraulic fluid is required to activate most subsea valves, and other pressure control devices, pressurized hydraulic power fluid reservoirs, or "accumulators", are used in conjunction with the low volume positive-displacement pumps. These accumulators usually takes the form of a hollow metal spherical or cylindrical canister partially-filled with a pressurized inert gas, such as nitrogen, and partially-filled with a pressurized hydraulic fluid. In operation, these accumulators are initially precharged with pressurized nitrogen prior to being submerged. The precharged pressure usually is equal to the anticipated pressure of the water that will be encountered at the depth of submersion of the accumulator. This precharging is necessary to provide a compressible medium that will accept a quantity of power fluid upon charging, and then expel it upon demand.

Grease accumulators have been utilized in the past to supply a grease to the subsea equipment. However, in the past, there has been no way for an operator of such grease accumulators to have any positive knowledge of when the accumulator is near empty. Typically, such grease accumulators are replaced at periodic intervals so as to assure that the grease is continually applied to the subsea equipment. In many circumstances, the accumulators are replaced either too early or too late. If they are replaced too early, then unnecessary operations are required. If the grease accumulators are replaced after they are entirely empty, then there would be an absence of grease flow to the important subsea equipment. If there is an absence of grease supplied to the subsea equipment, the pressure in the well could potentially blow out the equipment. As such, it is very important to continuously supply grease to the subsea components.

Another problem with existing grease accumulators is the fact that the flow of grease must be shut down as the accumulator bottle is replaced. Once again, during the shutdown of the grease accumulator or, during the period of replacement, there is the possibility that the well could blow out by virtue of the pressures applied to the components during the absence of grease flow. As such, it is very important to continuously have a supply of grease flowing to the subsea equipment, even during the replacement of the canisters.

In the past, various patents have issued relating to fluid accumulators for use in subsea applications. For example, U.S. Pat. No. 4,649,704, issued on Mar. 17, 1987 to G. L. Marsh, teaches a pressurized fluid accumulator adapted to be connected to a subsea valve actuator on a drilling wellhead assembly. There is a pressure-compensated piston located in a first hydraulic cylinder. The movement of this piston causes pressurized hydraulic fluid to be delivered in sufficient volume to activate a subsea hydraulically-activated valve. The first piston is connected to and driven by a second piston contained in a second hydraulic cylinder. The charging and accumulation of pressurized hydraulic fluid in the first cylinder causes a nearly absolute vacuum to be developed under the second piston. The pressure differential between this vacuum and the prevailing sea pressure is used to move the first piston during delivery of the hydraulic fluid to the actuator of the hydraulically-activated valve.

U.S. Pat. No. 6,202,753, issued on Mar. 20, 2001 to B. F. Baugh, describes a subsea accumulator and method of operation. This accumulator uses a differential between a high pressure ambient pressure source, such as sea water pressure, and a low pressure source, such as a chamber holding vacuum or atmospheric pressure, to provide storage and delivery of hydraulic power for operation of equipment.

U.S. Patent Publication No. 2007/0240882, published on Oct. 18, 2007 to Leonardi et al., provides an accumulator for subsea equipment. This accumulator apparatus comprises a housing and an accumulator within the housing at the first end of the housing. The accumulator has first and second chambers that are hermetically-sealed from one another. A pressurized gas in the first chamber and a pressurized fluid in the second chamber are arranged within the accumulator. A third chamber in the housing abuts the accumulator and contains silicon oil fluid. A movable piston is located within the housing proximate the second end of the housing. Ambient pressure is communicated to one end of the piston. Ambient pressure plus the pressure in the second chamber is communicated to the second end of the piston. The cross-sectional areas of the two ends of the piston are selected to optimize the pressure at which the piston begins to expel fluid from the second chamber.

U.S. Pat. No. 3,640,299, issued on Feb. 8, 1972 to N. A. Nelson, describes a subsea wellhead control system. This system has a single protective conduit connected at one end thereof to a control facility while its other end terminates in a connection structure located adjacent or attached to a remotely located wellhead. Suitable actuator control conduits extend from a plurality of fluid-controlled wellhead valve actuators and are connected in fluid communication to the connection structure. The valve accumulators are energized by the actuating fluid responsive to actuation of the pilot valves. An accumulator and pressure-balancing circuit are communicated to the fluid circuitry of each of the valve actuators in order to allow quick energized and deenergized actuation of the valve actuators. Fluid pressure is transferred from the accumulator and pressure-balancing circuitry to the actuator fluid supply of the fluid system upon reduction of pressure in the actuator fluid supply and such transfer may be aided by the hydrostatic head of the sea water in which the system is submerged.

U.S. Patent Publication No. 2008/0104951, published on May 8, 2008 to F. B. Springett, shows a subsea pressure accumulator system which has a body with three or more interior chambers. The body has a first body end with a first opening, and a second body end with a second opening. An amount of operational power fluid in the first chamber and an amount of pressurized gas in the second chamber move a piston assembly for moving power fluid from the body to operate an apparatus. The piston assembly has a cavity within a piston end for containing additional pressurized gas for moving the piston assembly.

U.S. Pat. No. 4,036,247, issued on Jul. 19, 1977 to B. F. Baugh, discloses a multi-pressure, single line supply system for purpose of conveying fluid from a single subsea supply conduit in order provide a fluid supply for each of a plurality of subsea well control apparatus that require fluid supplies at different pressure levels. A fluid receiver receives fluid under pressure from the single subsea supply conduit. A regulator regulates fluid flow from the receiver to charge one or more accumulators with fluid at desired pressure levels and to control injection of the fluid through an injection line into a subsea well flowline.

It is an object of the present invention to a grease accumulator apparatus that provides a positive visual indication of when the accumulator is empty or near-empty of grease.

It is another object of the present invention to a grease accumulator apparatus which continuously supplies grease to subsea equipment, even during periods of replacement.

It is another object of the present invention to a grease accumulator apparatus that automatically switches the flow of grease from one accumulator bottle to another accumulator bottle when the first accumulator bottle is near empty.

It is still another object of the present invention to a grease accumulator system which allows for the quick and easy replacement of the accumulator bottle in a safe and efficient manner.

These and other objects and advantages of the present invention will become apparent from a reading of the attached specification and appended claims.

BRIEF SUMMARY OF THE INVENTION

The present invention is a grease accumulator apparatus for use in subsea applications comprising a bottle having an internal chamber, a plunger positioned within the internal chamber and slidable therealong, and an end cap assembly affixed to one end of the bottle. The end cap assembly has an indicator member slidably connected thereto. The indicator member is cooperative with the plunger such that an end of the indicator member moves outwardly of the end cap assembly as the plunger moves in the bottle toward the end cap assembly.

The internal chamber of the bottle has a hydraulic fluid on one side of the plunger and a grease on an opposite side of the plunger. A source of hydraulic fluid is connected to the bottle and is in communication with hydraulic fluid on the one side of the plunger. The source of hydraulic fluid is suitable for adding hydraulic fluid into the internal chamber of the bottle so as to urge the plunger toward the end cap assembly. The end cap assembly has a grease outlet formed therein so as to allow grease to pass therethrough as the plunger is urged toward the end cap assembly.

In the present invention end cap assembly comprises a body, and a housing affixed to one end of the body. The housing has a hydraulic fluid inlet and a hydraulic fluid outlet formed through a wall thereof. The indicator member has a notch formed into a surface thereof. The indicator member is movable between a first position in which the notch fluidically connects the hydraulic fluid inlet and the hydraulic fluid outlet and a second position in which the indicator member blocks fluid flow between the hydraulic fluid inlet and the hydraulic fluid outlet. The indicator member is slidably mounted within the housing and has an indicator end extending outwardly of an end of the housing opposite the body. The body has an internal cavity formed therein so as to open at an end thereof facing the internal chamber of the bottle. The end cap assembly further comprises a shaft slidably mounted in the internal cavity. The shaft has a first end connected to the indicator member and an opposite end extending outwardly of the body and into the internal chamber of the bottle. The end cap assembly further has a cap member affixed over an end of the internal cavity at the end of the body. The cap member has a channel formed therethrough. The shaft has a portion extending through the channel of the cap member. The shaft has a flange extending radially outwardly therefrom. The flange has an outer periphery adjacent a wall of the internal cavity. The end cap assembly further includes a spring positioned within the internal cavity and urging against the flange of the shaft. The spring, in particular, is a plurality of belleville washers arranged within the internal cavity.

A closure member is affixed over an end of the bottle opposite the end cap assembly. The closure member has a fluid passageway opening to the internal chamber of the body.

The present invention is also an automatic accumulator switching system. This switching system comprises a first bottle having an internal chamber, a first plunger positioned within the internal chamber of the first bottle and slidable thereaong, a first end cap assembly affixed to one end of the first bottle, a first closure member affixed over an end of the first bottle opposite the first end cap assembly and having a fluid passageway opening to the internal chamber of the first bottle, a second bottle having an internal chamber, a second plunger positioned within the internal chamber of the second bottle and slidable thereaong, a second end cap assembly affixed to one end of the second bottle, and a second closure member affixed over an end of the second bottle opposite the second end cap assembly. The first end cap assembly has a first housing having a hydraulic fluid inlet and a hydraulic fluid outlet formed through a wall of the housing, and a first shaft slidably positioned within the channel of the housing. The first shaft is movable between a first position in which the hydraulic fluid inlet is fluidically connected to the hydraulic fluid outlet and a second position in which fluid flow is blocked between the hydraulic fluid inlet and hydraulic fluid outlet. The second end cap assembly has an identical configuration to that of the first end cap assembly. The hydraulic fluid outlet of the first housing of the first end cap assembly is fluidically connected to the fluid passageway of the second closure member. The hydraulic fluid outlet of the housing of the second end cap assembly is fluidically connected to the fluid passageway of the first closure member. The first shaft has a portion extending outwardly of the housing of the first end cap assembly when the first plunger moves toward the first end cap assembly. The second shaft has a portion extending outwardly of the second housing when the second plunger moves toward second end cap assembly.

DETAILED DESCRIPTION OF THE INVENTION

Figure 1:
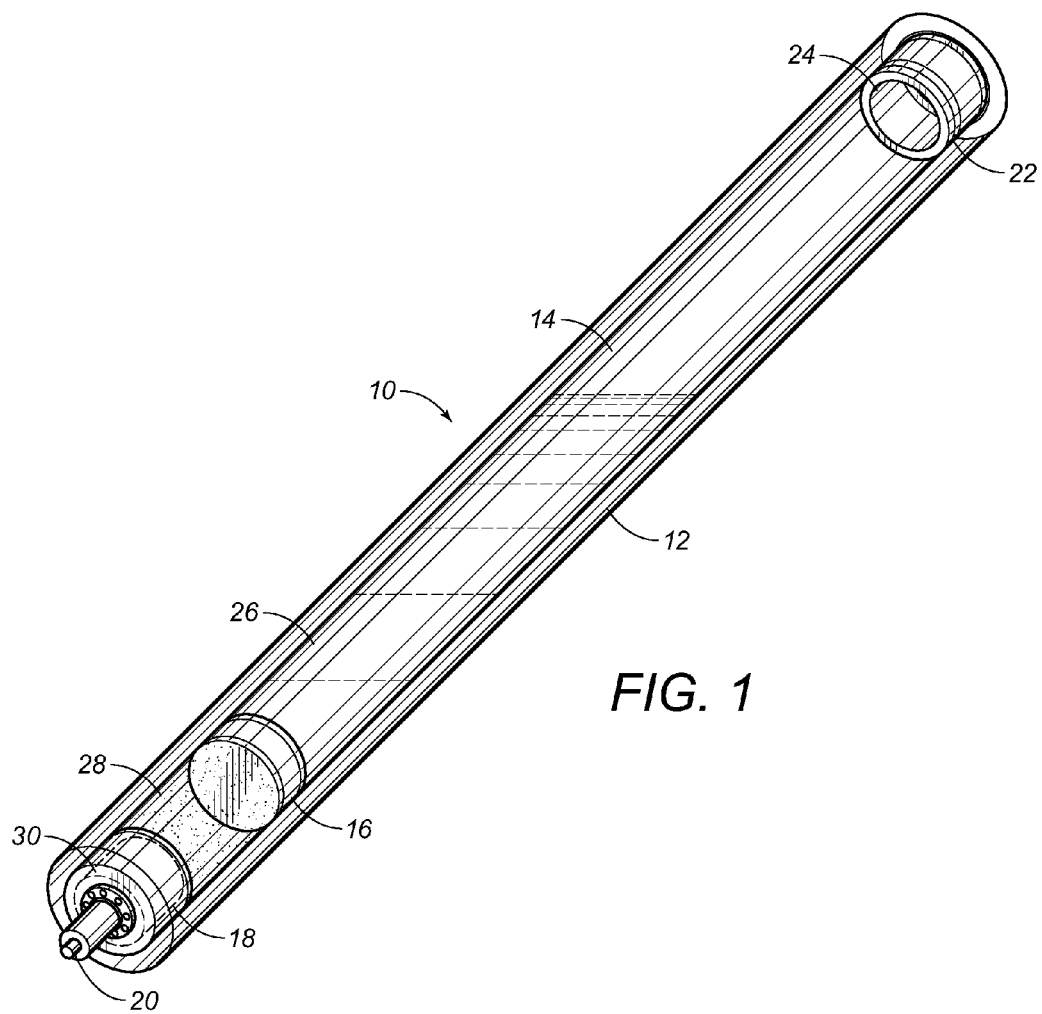
FIG. 1 is a partically transparent perspective view of the grease accumulator apparatus of the present invention.

Referring to FIG. 1, there is shown the grease accumulator apparatus 10 in accordance with the teachings of the present invention. In particular, the grease accumulator apparatus 10 has a bottle 12 having an internal chamber 14, a plunger 16 positioned within the internal chamber 14 of the bottle 12 and slidable therealong, and an end cap assembly 18 affixed to one end of the bottle 12. The end cap assembly 18 has an indicator member 20 slidably connected thereto. In actual use, the indicator member 20 is cooperative with the plunger 16 such that an end of the indicator member 20 moves outwardly of the end cap assembly 18 as the plunger 16 moves in the bottle 12 toward the end cap assembly 18. A closure member 22 is affixed over an end of the bottle 12 opposite to the end cap assembly 18. This closure member 22 has a fluid passageway 24 opening to the internal chamber 14 of the bottle 12. As such, the fluid passageway 24 allows a hydraulic fluid to enter the internal chamber 14 of bottle 12.

In FIG. 1, it can be seen that the plunger 16 is located within the internal chamber 14 of the bottle 12 so as to divide the chamber into one side 26 and another side 28. The side 26 of the internal chamber 14 will contain the hydraulic fluid therein. The side 28 of the internal chamber 14 will contain grease therein. As the plunger 16 moves toward the end cap assembly 18, the plunger 16 will serve to push grease outwardly of the end cap assembly 18 through a fluid passageway 30 formed therein. The plunger 16 moves within the internal chamber 14 by the application of hydraulic fluid through the fluid passageway 24 and into the side 26 of the internal chamber 14. As the hydraulic fluid acts with pressure on one side of the plunger 16, the plunger 16 will move toward the end cap assembly 18. In normal use, the grease accumulator apparatus 10 will be filled with grease such that the plunger 16 will reside generally adjacent to the closure member 22. As such, grease can be continually provided by the grease accumulator apparatus 10 as long as grease remains in the side 28 of the plunger 16 of internal chamber 14.

Figure 2:
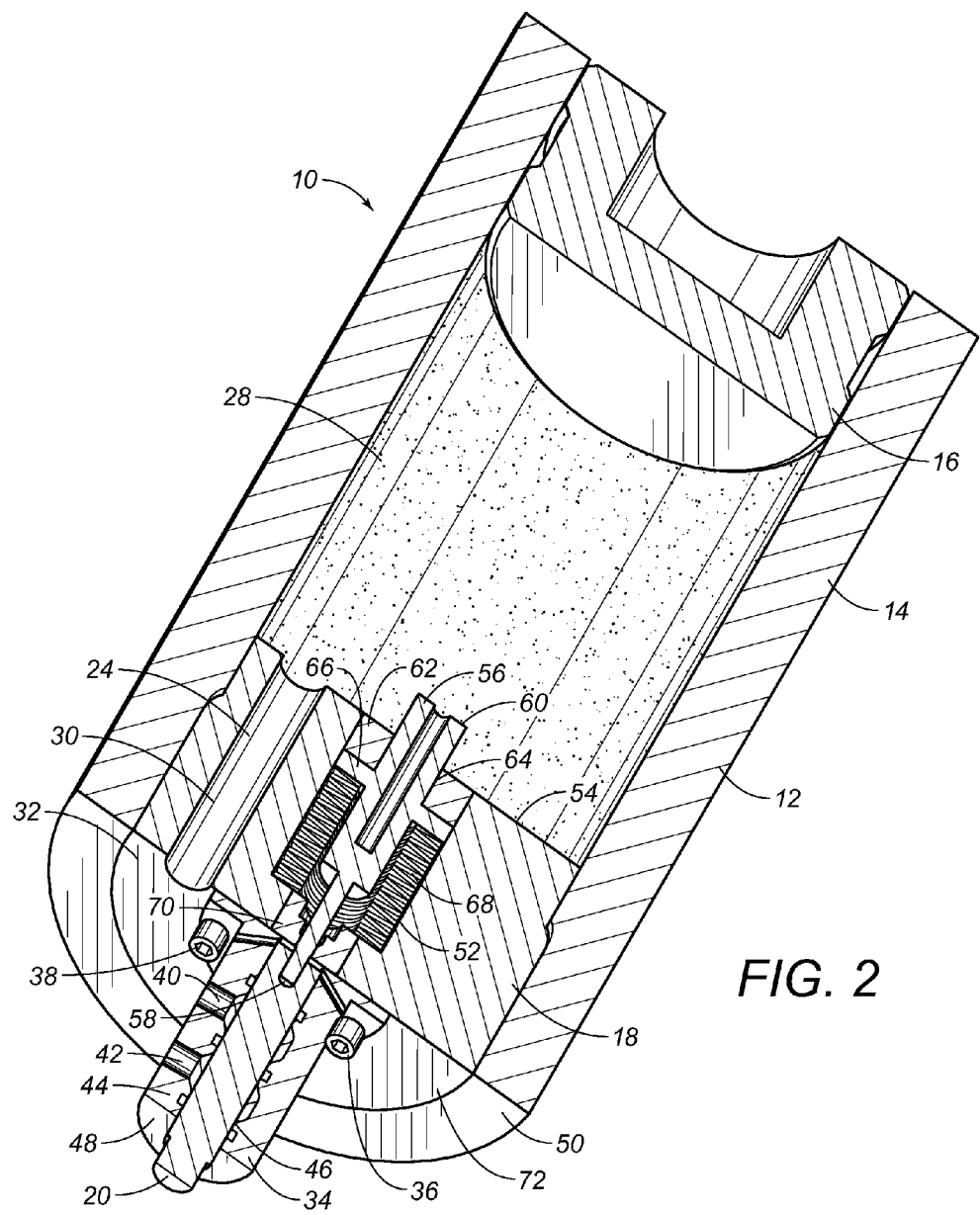
FIG. 2 is a cross-sectional view of the plunger and end cap assembly of the grease accumulator apparatus of the present invention.

FIG. 2 is a detailed view showing the interaction between the plunger 16 and the end cap assembly 18. In particular, the end cap assembly 18 is formed of a body 32 having a housing 34 affixed thereto. It can be seen that the housing 34 is secured to the end of the body 32 by bolts 36 and 38. It can be seen that the fluid passageway 24 extends through the body 32 so as to have one end opening to the side 28 of the internal chamber 14 of body 12. As such, as the plunger 16 moves toward the end cap assembly 18, grease will be pushed through the fluid passageway 24 and outwardly of the grease accumulator apparatus 10.

The housing 34 has a fluid inlet 40 and a fluid outlet 42. The hydraulic fluid inlet 40 and the hydraulic fluid outlet 42 are formed through a wall 44 of the housing 34. As will be described hereinafter, the indicator member 20 is movable between a first position in which a notch formed on the indicator member 20 fluidically connects the hydraulic fluid inlet 40 to the hydraulic fluid outlet 42 and a second position in which the indicator member 20 blocks fluid flow between the hydraulic fluid inlet 40 and the hydraulic fluid outlet 42.

The indicator member 20 is slidably positioned within a channel 46 formed within the housing 34. Various seals are formed adjacent to the channel 46 so as to effectively seal surfaces of the indicator member 20 from the hydraulic fluid inlet 40 and the hydraulic fluid outlet 42. In normal use, the indicator member 20 is in the form of a shaft that extends through the channel 46 longitudinally. A portion of the indicator member 20 protrudes outwardly of the end 48 of the housing 34.

The body 32 is secured by threading, or by other means, into the end 50 of the bottle 12. The body 32 has an internal cavity 52 formed therein so as to open at an end 54 of the body 32. This end 54 faces the internal chamber 14 of the bottle 12. A shaft 56 is slidably positioned within the internal cavity 52. The shaft 56 has an end 58 that is connected to an end of the indicator member 20. An opposite end 60 of the shaft 56 extends outwardly of the end 54 of the body 32 and into the internal chamber 14 of the bottle 12.

A cap member 62 is affixed over the end of the internal cavity 52 at the end 54 of body 32. The cap member 62 has a channel 64 formed therethrough. The shaft 56 has a portion extending through the channel 64 of the cap member 62.

The shaft 56 has a flange 66 that extends radially outwardly therefrom. The flange 66 has an outer periphery that is adjacent to an internal wall of the internal cavity 52. A spring 68 is positioned within the internal cavity 52 so as to urge against the flange 66 of the shaft 56. A sealing member 70 is secured within the internal cavity 52 of the body 32 generally adjacent to the end 72 of the body 32. Sealing member 70 establishes a seal between the end 58 of the shaft 56 and the internal cavity 52. As such, the end 58 of shaft 56 is free to slide in sealed relationship with the internal surfaces of the sealing member 70. The spring 68 is in the form of belleville washers arranged within the internal cavity 52.

As can be seen in FIG. 2, as the plunger 16 moves toward the end cap assembly 18, the plunger 16 will eventually reach a point so as to contact the end 60 of shaft 56. The continued movement of the plunger 16 will urge the shaft 56 inwardly of the internal cavity 52 so as to simultaneously urge the indicator member 20 outwardly of the end 48 of the housing 34. As such, those that monitor the status of the grease accumulator apparatus 10 can have a visual indication that the plunger has moved into proximity with the end cap assembly 18 and that the bottle 12 is nearly empty of grease. A suitable indicator color, such as red, can be placed over the end of the indicator member 20 so as to provide a more striking visual indication of the condition of the bottle 12.

Figure 3:
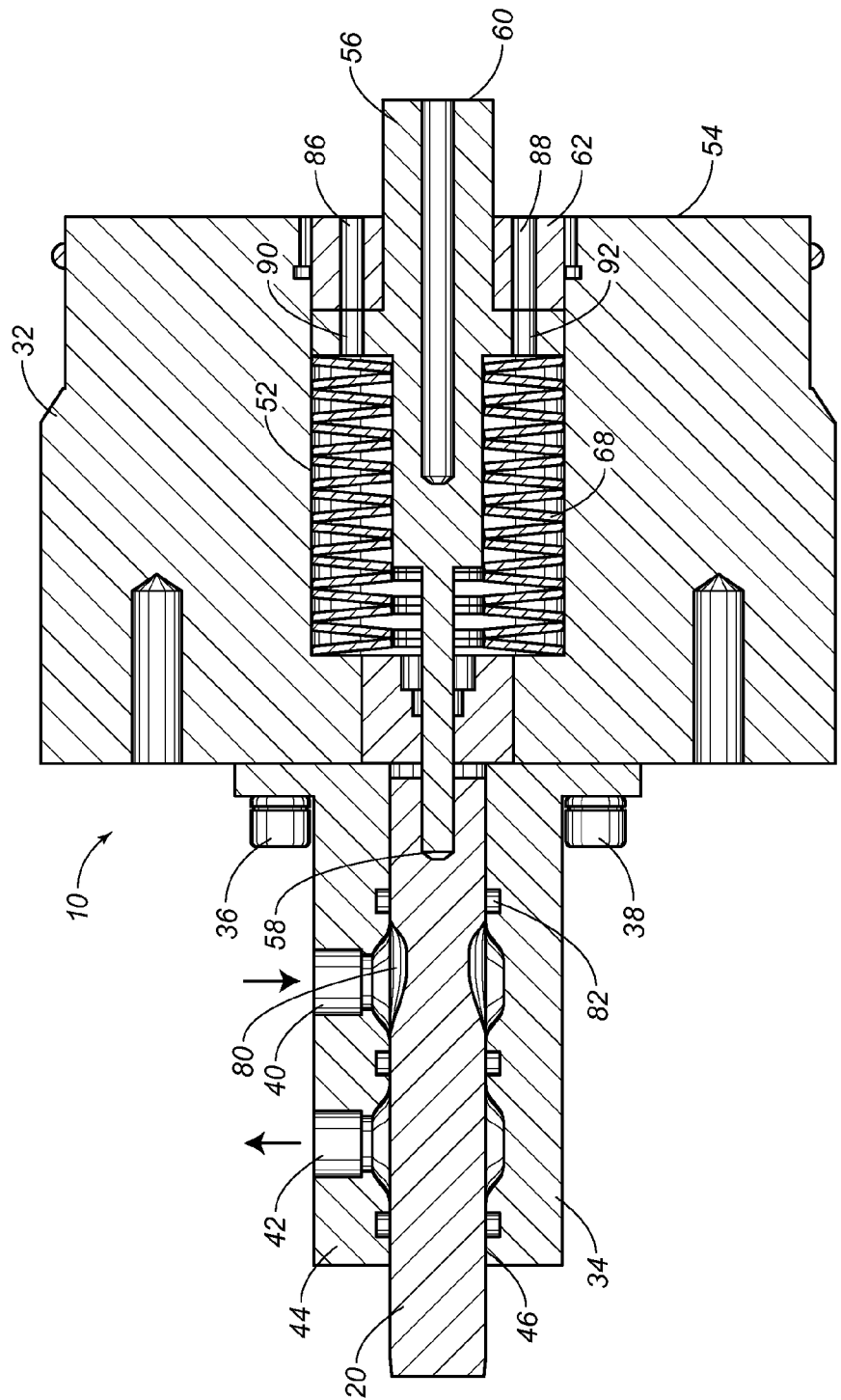
FIG. 3 is a cross-sectional view of the end cap assembly of the grease accumulator apparatus of the present invention showing the hydraulic fluid inlet and outlet in a fluid-blocked arrangement.

FIG. 3 shows the arrangement of the hydraulic fluid inlet 40 and the hydraulic fluid outlet 42 as formed through the wall 44 of the housing 34. In particular, it can be seen that the indicator member 20 extends through the internal channel 46 of the housing 34 and is slidably positioned therein.

FIG. 3 illustrates, in particular, the condition of the grease accumulator apparatus 10 of the present invention when the bottle 12 has a sufficient quantity of grease therein. In this condition, the indicator member 20 is in a retracted position so as to prevent fluid flow between the hydraulic fluid inlet 40 and the hydraulic fluid outlet 42. There is a notch 80 formed on the surface of the shaft 56. In the position illustrated in FIG. 3, the notch 80 is aligned with the hydraulic fluid inlet 40. The seal 82 creates a fluid-tight seal between the outer surface of the indicator member 20 and the inner wall of the channel 46. As such, the seal 82 prevents fluid flow from passing from the hydraulic fluid inlet 40 to the hydraulic fluid outlet 42.

Also, in FIG. 3, it can be seen that the cap member 62 has a pair of channels 86 and 88 extending therethrough. Channels 86 and 88 will open to the interior of the bottle 12 at the end 54 of the body 32. Channels 86 and 88 allow grease to pass therethrough and into the internal cavity 52 of the body 32. Similar channels 90 and 92 are shown as aligned with the channels 86 and 88, respectively. Because of this alignment, grease will flow through the channels 86 and 90 and into the internal cavity 52. Similarly, grease will flow through the internal channels 88 and 92 and into the cavity 52. The result of this grease flow will cause pressures on both sides of the shaft 56 to equalize. The belleville washers, acting as springs 68, is the only force that resists movement of the shaft 56 when contact is made between the plunger 16 and the end 60 of shaft 56. When the plunger 16 makes contact with the end 60 of the shaft 56, the force of the hydraulic fluid pressure within the side 14 of the plunger 16 will overcome the resistance of the spring 68 so as to urge the shaft 56 through the internal cavity 52 so as to correspondingly move the indicator member 20 outwardly of the end of the housing 44.

Figure 4:
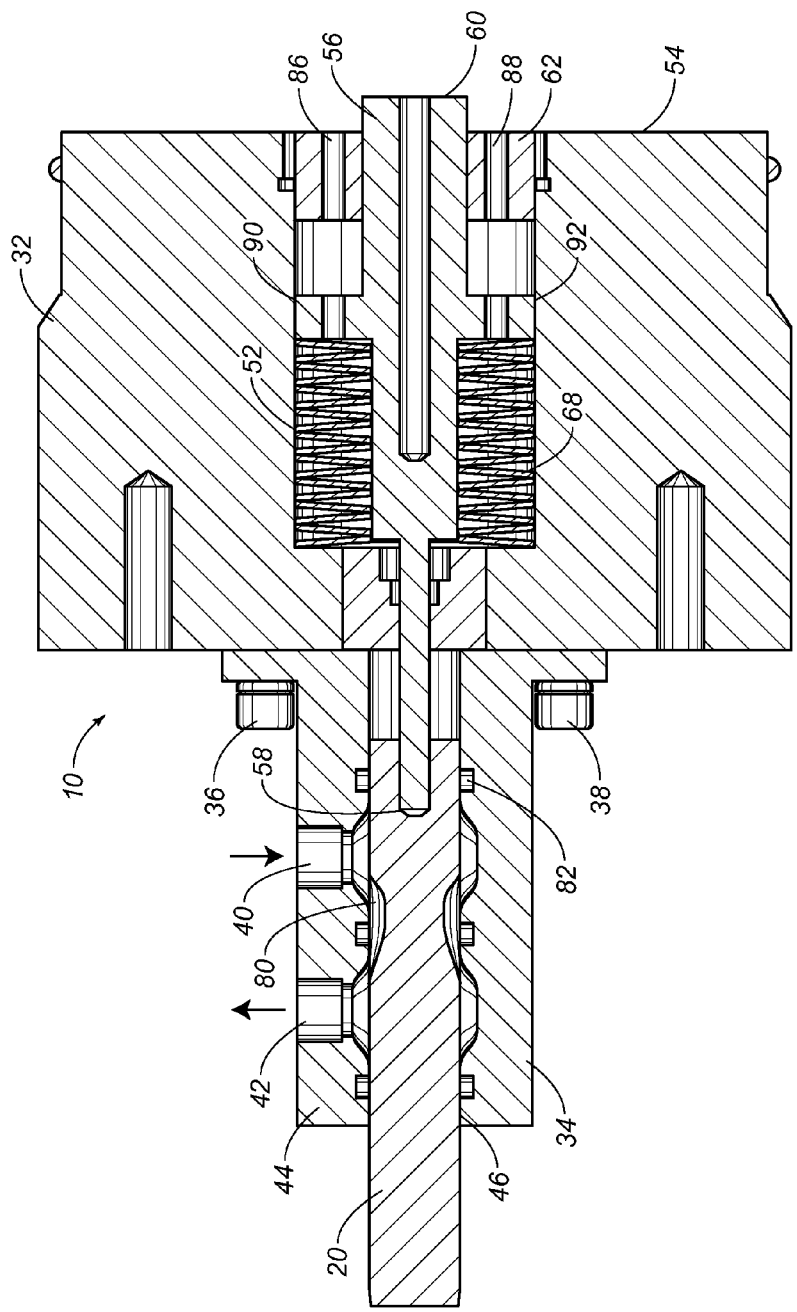
FIG. 4 is a cross-sectional view of the end cap assembly of the grease accumulator apparatus of the present invention showing the hydraulic fluid inlet and outlet in fluid communication.

FIG. 4 illustrates the condition of the grease accumulator apparatus 10 at the time when the plunger 16 has pushed the end 60 to a position adjacent to the end 54 of the body 32. The position illustrated in FIG. 4 will provide an indication that the grease accumulator apparatus 10 is substantially empty of grease. As such, the indicator member 20 will provide a remote viewer with a visual indication of this empty condition. As such, initial steps can be taken so as to replace the grease accumulator apparatus 10 in a fast, safe and efficient manner. As such, the indication provided by indicator member 20 will alert those operators of a drilling rig of this "low grease" condition prior to encountering an instance where the rig is operating without proper grease supplies.

It can be seen in FIG. 4 that the shaft 56 has moved inwardly of the internal cavity 52. As such, the force exerted by the plunger 16 on the end 60 of shaft 56 has overcome the resistance of the springs 68. As such, the end 58 of the shaft 56 will urge on the indicator member 20 so as to move the indicator member 20 into an outwardly extending position. Simultaneously, the notch 80 will move to a position so as to allow fluid flow between the hydraulic fluid inlet 40 and the hydraulic fluid outlet 42.

In addition to the ability to provide a remote viewer with an indication of a "low grease" condition within the grease accumulator apparatus 10, the present invention also a means so as to supply hydraulic fluid to another grease accumulator apparatus at the time that the "low grease" condition occurs. As such, the present invention avoids any possibility of a dry condition in the oil and gas well.

In particular, in FIG. 4, it can be seen that the hydraulic fluid entering the hydraulic fluid inlet 40 will flow along the notch 80 of the indicator member 20 and outwardly thereof toward the hydraulic fluid outlet 42. As such, the hydraulic fluid will flow around the seal 82.

Figure 5:
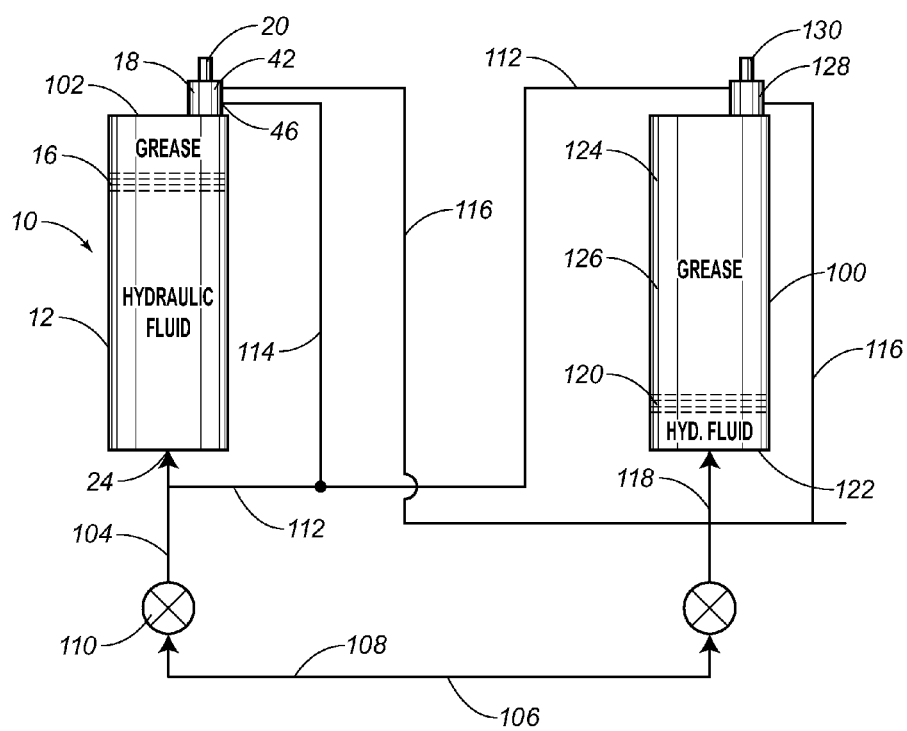
FIG. 5 is a schematic illustration of the automatic switching accumulator system of the present invention.

FIG. 5 is a schematic view of the grease accumulator apparatus 10 as used in conjunction with an additional grease accumulator apparatus 100. It can be seen that the grease accumulator apparatus 10 is in a "low grease" condition. As such, the hydraulic fluid has pushed the plunger 16 into a position generally adjacent to the end 102 of the bottle 12. In this condition, the plunger 16 has acted upon the shaft 56 so as to urge the indicator member 20 a substantial distance outwardly of the end cap assembly 18. As such, the indicator member 20 will provide a positive indication of this "low grease" condition.

FIG. 5 shows that there is a line 104 that is connected to the fluid passageway 24 on the closure member 22 on the grease accumulator apparatus 10. A source of hydraulic fluid 106 is connected along a line 108 by way of valve 110 to the grease accumulator apparatus 10. As a result, when the valve 110 is opened, the source of hydraulic fluid will pass through line 108 and along line 104 and into the fluid passageway 24 of the closure member 22. This hydraulic fluid pressure will urge the plunger 16 toward the end cap assembly 18 as grease is released through the end cap assembly 18.

When the valve 110 is opened, hydraulic fluid will also flow along line 112 toward the hydraulic fluid inlet 40 on the end cap assembly 18. The hydraulic fluid will pass along line 112 so as to flow through line 114 and toward the inlet 40.

Since the grease accumulator apparatus 10 is in a "low grease" or a "no grease" condition, the indicator member 20 has moved to a position such that the notch 80 fluidically connects the hydraulic fluid inlet 40 to the hydraulic fluid outlet 42. As a result, the hydraulic fluid will flow along line 116 to a line 118 extending to a fluid passageway in the closure member of the second grease accumulator apparatus 100. As such, a continuous flow of grease will occur even though one of the accumulators 10 and 100 is in a "low grease" condition. As such, the oil and gas production operations will continue to receive proper grease from the second accumulator 100.

The second accumulator 100 is shown as having a plunger 120 located at a position generally adjacent to the closure member 122. As such, there is a substantial volume of grease 124 within the interior volume of the bottle 126 of the accumulator apparatus 100. The hydraulic fluid passing along lines 116 and 118 will serve to drive the plunger 120 toward the end cap assembly 128. Since the indicator member 130 is in its retracted or first position, fluid flow between the hydraulic fluid inlet and the hydraulic fluid outlet is blocked. As such, there will be no fluid flow from the line 116 to line 112. However, when the indicator member 130 moves to its outwardly extending position, there will be fluid flow between the hydraulic fluid inlet and the hydraulic fluid outlet such that hydraulic fluid can now flow through line 112 back to the fluid passageway 24 on the end cap assembly 22 of the bottle 12.

As a result of the present invention, it is possible to replace the grease accumulator bottles without any interruption of grease flow. All that is necessary will be to remove the empty grease accumulator and replace it with a full accumulator. The indicator member 20 can allow the operator to replace the grease accumulator in a timely and efficient manner. When the "low grease" is indicated by the indicator member 20, the bottle 12 can be replaced by another bottle. If the indicator member 20 should continue to show the "low grease" condition, and the bottle 12 is not replaced, there is no difficulty since the hydraulic fluid will be directed to the second accumulator bottle 100 so that constant grease flow is provided to the rig. As such, the present invention provides a positive indication of a "low grease" condition and also provides for automatic switching in the event of such a "low grease" condition.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A grease accumulator apparatus for use in a subsea application, the grease accumulator apparatus comprising:
    a bottle having an internal chamber;
    a plunger positioned within said internal chamber of said bottle and slidable therealong;
    an end cap assembly affixed to one end of said bottle, said end cap assembly having an indicator member slidably positioned thereto, said indicator member cooperative with said plunger such that an end of said indicator member moves outwardly of said end cap assembly as said plunger moves in said bottle toward said end cap assembly, said end cap assembly comprising:
        a body;
        a housing affixed to one end of said body, said housing having a hydraulic fluid inlet and a hydraulic fluid outlet formed through a wall thereof, said indicator member having a notch formed into a surface thereof, said indicator member movable between a first position in which said notch fluidically connects said hydraulic fluid inlet and said hydraulic fluid outlet and a second position in which said indicator member blocks fluid flow between said hydraulic fluid inlet and said hydraulic fluid outlet, said body having an internal cavity formed therein so as to open at an end thereof facing said internal chamber of said body;
        a shaft slidably mounted in said internal cavity, said shaft having a portion extending outwardly of said body and into said internal chamber of said bottle; and
        a spring positioned urging against said shaft, said spring positioned in said internal cavity of said body, said body having a first channel formed therein and opening to said internal chamber of said bottle and a second channel formed therein and opening to said internal chamber of said bottle, said first and second channels positioned on opposite sides of said shaft.

2. The grease accumulator apparatus of claim 1, said internal chamber of said bottle having a hydraulic fluid on one side of said plunger and a grease on an opposite side of said plunger.

3. The grease accumulator apparatus of claim 2, further comprising:
    a source of hydraulic fluid connected to said bottle and in communication with said hydraulic fluid on said one side of said plunger, said source of hydraulic fluid suitable for adding hydraulic fluid into said internal chamber of said bottle so as to urge said plunger toward said end cap assembly.

4. The grease accumulator apparatus of claim 2, said end cap assembly having a grease outlet formed therein so as to allow grease to pass therethrough as said plunger is urged toward said end cap assembly.

5. The grease accumulator apparatus of claim 1, said indicator member being slidably mounted within said housing and having an indicator end extending outwardly of an end of said housing opposite said body.

6. The grease accumulator apparatus of claim 1, said shaft having a first end connected to said indicator member and an opposite end extending outwardly of said body.

7. The grease accumulator apparatus of claim 1, said end cap assembly further comprising:
    a cap member affixed over an end of said internal cavity at said end of said body.

8. The grease accumulator apparatus of claim 1, said shaft having a flange extending radially outwardly therefrom, said flange having an outer periphery adjacent a wall of said internal cavity, said spring urging against said flange of said shaft.

9. The grease accumulator apparatus of claim 1, said spring comprising a plurality of belleville washers arranged within said internal cavity.

10. The grease accumulator apparatus of claim 1, further comprising:
    a closure member affixed over an end of said bottle opposite said end cap assembly, said closure member having a fluid passageway opening to said internal chamber of said bottle.

11. A grease accumulator apparatus for use in a subsea application comprising:
    a bottle having an internal chamber;
    a plunger positioned within said internal chamber and slidable therealong;
    an end cap assembly affixed to one end of said bottle, said end cap assembly comprising:
        a housing having a hydraulic fluid inlet and a hydraulic fluid outlet formed through a wall of said housing, said housing having a channel formed therein;
        a first shaft slidably positioned within said channel of said housing, said first shaft having a notch formed therein, said first shaft movable between a first position in which said notch fluidically connects said hydraulic fluid inlet and said hydraulic fluid outlet and a second position in which said first shaft blocks fluid flow between said hydraulic fluid inlet and said hydraulic fluid outlet;
        a body having an internal cavity formed therein so as to open at an end thereof facing said internal chamber of said bottle;
        a second shaft slidably mounted in said internal cavity, said second shaft having a first end connected to said first shaft and a second end extending outwardly of said body and into said internal chamber of said bottle, said second shaft having a flange extending radially outwardly therefrom, said flange having an outer periphery adjacent a wall of said internal cavity; and a spring positioned within said internal cavity and urging against said flange of said shaft.

12. An automatic accumulator switching system comprising:

a first bottle having an internal chamber;

a first plunger positioned within said internal chamber of said first bottle and slidable therealong;

a first end cap assembly affixed to one end of said first bottle, said first end cap assembly comprising:

a first housing having a hydraulic fluid inlet and a hydraulic fluid outlet formed through a wall of said housing, said housing having a channel formed therein; and a first shaft slidably positioned within said channel of said housing, said first shaft movable between a first position in which said hydraulic fluid inlet is fluidically connected to said hydraulic fluid outlet and a second position in which said first shaft blocks fluid flow between said hydraulic fluid inlet and hydraulic fluid outlet;

a first closure member affixed over an end of said first bottle opposite said first end cap assembly, said first closure member having a fluid passageway opening to said internal chamber of said first bottle;

a second bottle having an internal chamber;

a second plunger positioned within said internal chamber of said second bottle and slidable therealong;

a second end cap assembly affixed to one end of said second bottle, said second end cap assembly comprising:

a second housing having a hydraulic fluid inlet and a hydraulic fluid outlet formed through a wall of said second housing, said second housing having a channel formed therein; and a second shaft slidably positioned within said channel of said housing, said second shaft movable between a first position in which said hydraulic fluid inlet of said second housing is fluidically connected to said hydraulic fluid outlet of said second housing and a second position in which said second shaft blocks fluid flow between said hydraulic fluid inlet of said second housing and hydraulic fluid outlet of said second housing; and a second closure member affixed over an end of said second bottle opposite said second end cap assembly, said second closure member having a fluid passageway opening to said internal chamber of said second bottle, said hydraulic fluid outlet of said first housing of said first end cap assembly fluidically connected to said fluid passageway of said second closure member.

13. The automatic accumulator switching system of claim 12, said hydraulic fluid outlet of said second housing of said end cap assembly fluidically connected to said fluid passageway of said first closure member.

14. The automatic accumulator switching system of claim 12, said first shaft having a portion extending outwardly of said first housing when said first plunger moves toward said first end cap assembly, said second shaft having a portion extending outwardly of said second housing when said second plunger moves toward second end cap assembly.

* * * * *